(12) United States Patent
Linder et al.

(10) Patent No.: US 12,105,115 B2
(45) Date of Patent: Oct. 1, 2024

(54) METHOD AND SYSTEM FOR MONITORING A FAN

(71) Applicant: SCHNEIDER ELECTRIC IT CORPORATION, Foxboro, MA (US)

(72) Inventors: Stephen Paul Linder, Medford, MA (US); Damir Klikic, Waltham, MA (US)

(73) Assignee: SCHNEIDER ELECTRIC IT CORPORATION, Foxboro, MA (US)

(*) Notice: Subject to any disclaimer, the term of this patent is extended or adjusted under 35 U.S.C. 154(b) by 1058 days.

(21) Appl. No.: 17/015,698

(22) Filed: Sep. 9, 2020

(65) Prior Publication Data

US 2021/0072272 A1 Mar. 11, 2021

Related U.S. Application Data

(60) Provisional application No. 62/898,064, filed on Sep. 10, 2019.

(51) Int. Cl.
| | |
|---|---|
| *G01P 3/481* | (2006.01) |
| *G01K 3/00* | (2006.01) |
| *G01M 13/04* | (2019.01) |
| *H02P 6/08* | (2016.01) |

(52) U.S. Cl.
CPC .............. *G01P 3/481* (2013.01); *G01K 3/005* (2013.01); *G01M 13/04* (2013.01); *H02P 6/08* (2013.01)

(58) Field of Classification Search
CPC ................................ G01P 3/481; G01K 3/005
See application file for complete search history.

(56) References Cited

U.S. PATENT DOCUMENTS

| | | | |
|---|---|---|---|
| 6,396,688 B1 * | 5/2002 | Davies | G06F 1/206 361/679.48 |
| 6,400,113 B1 | 6/2002 | Garcia et al. | |
| 6,792,550 B2 * | 9/2004 | Osecky | G06F 11/3006 714/E11.144 |

(Continued)

FOREIGN PATENT DOCUMENTS

| | | |
|---|---|---|
| DE | 102008009612 A1 | 8/2009 |
| GB | 2410379 A | 7/2005 |

(Continued)

OTHER PUBLICATIONS

Ahmed Nabhan. 2016. "Vibration Analysis of Adding Contaminants Particles and Carbon Nanotubes to Lithium Grease of Ball Bearing." In ResearchGate. vol. 8. Moscow (Russia): JVE International Conferences.

(Continued)

*Primary Examiner* — Walter L Lindsay, Jr.
*Assistant Examiner* — Milton Gonzalez
(74) *Attorney, Agent, or Firm* — Lando & Anastasi, LLP

(57) ABSTRACT

A system for monitoring a fan used to cool equipment includes memory storing controller-executable instructions, and a controller configured to execute the instructions, which cause the controller to operate a fan, perform a deceleration test on the fan to obtain deceleration test data, calculate a variance of the deceleration test data, make a determination that the fan is susceptible to imminent failure based on the variance, and generate a signal for the equipment to enter a low-heat producing mode based on the determination.

16 Claims, 9 Drawing Sheets

(56) References Cited

U.S. PATENT DOCUMENTS

| | | | | |
|---|---|---|---|---|
| 7,142,125 | B2* | 11/2006 | Larson | H02H 3/44 |
| | | | | 310/55 |
| 2012/0189325 | A1 | 7/2012 | Kushima et al. | |
| 2015/0192913 | A1 | 7/2015 | Vitek | |
| 2018/0183379 | A1* | 6/2018 | Yokoyama | H02P 27/08 |

FOREIGN PATENT DOCUMENTS

| | | |
|---|---|---|
| JP | H1185301 A | 3/1999 |
| JP | 2009187347 A | 8/2009 |
| JP | 2015080638 A | 4/2015 |

OTHER PUBLICATIONS

Bianca Schroeder, and Garth A. Gibson. 2007. "Disk Failures in the Real World: What Does an MTTF of 1, 000, 000 Hours Mean to You?" In 5th USENIX Conference on File and Storage Technologies, FAST. San Jose, CA, USA.

Dwyer-Joyce, R. S. 1999. "Predicting the Abrasive Wear of Ball Bearings by Lubricant Debris." Wear 233-235 (December): 692-701.

Hu, Chao, Byeng D. Youn, Taejin Kim, and Pingfeng Wang. 2015. "A Co-Training-Based Approach for Prediction of Remaining Useful Life Utilizing Both Failure and Suspension Data." Mechanical Systems and Signal Processing 62-63 (October): 75-90.

Jin, X., E. W. M. Ma, L. L. Cheng, and M. Pecht. 2012. "Health Monitoring of Cooling Fans Based on Mahalanobis Distance With MRMR Feature Selection." IEEE Transactions on Instrumentation and Measurement 61 (8): 2222-29.

Maru, M. M., R. S. Castillo, and L. R. Padovese. 2007. "Study of Solid Contamination in Ball Bearings through Vibration and Wear Analyses." Tribology International 40 (3): 433-40.

Miao, Q., M. Azarian, and M. Pecht. 2011. "Cooling Fan Bearing Fault Identification Using Vibration Measurement." In 2011 IEEE Conference on Prognostics and Health Management, 1-5.

Miettinen, Juha, and Peter Andersson. 2000. "Acoustic Emission of Rolling Bearings Lubricated with Contaminated Grease." Tribology International 33 (11): 777-87.

Oh, Hyunseok, Michael H. Azarian, Carlos Morillo, Michael Pecht, and Edward Rhem. 2015. "Failure Mechanisms of Ball Bearings under Lightly Loaded, Non-Accelerated Usage Conditions." Tribology International 81 (January): 291-99.

Zhang, B., C. Sconyers, C. Byington, R. Patrick, M. E. Orchard, and G. Vachtsevanos. 2011. "A Probabilistic Fault Detection Approach: Application to Bearing Fault Detection." IEEE Transactions on Industrial Electronics 58 (5): 2011-18.

Zhou, Linghao, Fang Duan, Michael Corsar, Faris Elasha, and David Mba. 2017. "A Study on Helicopter Main Gearbox Planetary Bearing Fault Diagnosis." Applied Acoustics, December.

Extended European Search Report from corresponding European Applicatio No. 20195383.3 dated Jan. 29, 2021.

\* cited by examiner

METHOD AND SYSTEM FOR MONITORING A FAN

CROSS-REFERENCE TO RELATED APPLICATION

This application claims the benefit under 35 U.S.C. § 119(e) of U.S. Provisional Patent Application No. 62/898,064 titled METHOD AND SYSTEM FOR MONITORING A FAN filed on Sep. 10, 2019, which is herein incorporated by reference in its entirety for all purposes.

BACKGROUND

1. Field of Disclosure

The present disclosure relates generally to power and cooling systems, and more particularly to a system and method for monitoring a fan used in power and cooling systems.

2. Discussion of Related Art

Heat produced by rack-mounted Information Technology (IT) equipment can have adverse effects on the performance, reliability and useful life of the equipment components. In particular, rack-mounted equipment, housed within an enclosure, may be vulnerable to heat build-up and hot spots produced within the confines of the enclosure during operation. The amount of heat generated by a rack of equipment is dependent on the amount of electrical power drawn by equipment in the rack during operation and the efficiency of the equipment. In addition, users of electronic equipment may add, remove, and rearrange rack-mounted components as their needs change and new needs develop. Cooling units are used to cool electronic equipment within the equipment racks. Such cooling units may employ fans to move air. In addition to power supplies, UPSs and cooling units, other equipment having fans can be used within the data center, such as ventilation fans.

Fans may be used in computer and IT equipment. One hardware failure in data centers is the failure of fans. These fans predominately may brushless DC motors with ball bearings that can have a L10 value of over seven years.

SUMMARY OF DISCLOSURE

One aspect of the present disclosure is directed to a method of monitoring a fan. In one embodiment, the method comprises: obtaining deceleration speed data for a fan; periodically performing a deceleration test on the fan; calculating results summarizing the variability in deceleration from the deceleration test; and using changes in variability to determine whether the fan is susceptible to imminent failure.

One aspect of the method further may include, if the fan is determined to be susceptible to failure, replacing the fan with a new fan. Obtaining deceleration speed data may include capturing a set of deceleration curves. Determining whether the fan is susceptible to failure may include determining whether the test deceleration curve shows statistically significant variability from the one or more deceleration curves by a predetermined amount. Periodically performing a deceleration test on the fan may include conducting a deceleration test at least one time during a predetermined time period.

Another aspect of the disclosure is directed to a method of verifying the viability of monitoring a fan. In one embodiment, the method comprises: contaminating bearings with a contaminant; replacing bearings of an existing fan with contaminated bearings; operating the fan by running the fan and periodically decelerating the fan; collecting data from the fan; and determining a failure point of the fan.

Embodiments of the method further may include running the fan at an operational speed for a first predetermined period of time, and at the end of the first predetermined period of time, turning off the fan for a second predetermined period of time. The first predetermined period of time may be between four and ten minutes, e.g., six minutes. The second predetermined period of time may be ten seconds or until the fan comes to a stop. Contaminating bearings may include placing the bearings in a tumbler with the contaminant. The contaminant may include 1200 grit Aluminum Oxide abrasive powder. Collecting data may include use of a single board computer. Collecting data further may include obtaining rotational speed data from the fan with an IR beak sensor.

Another aspect of the present disclosure is directed to a system for monitoring a fan used to cool equipment. In one embodiment, the system comprises memory storing controller-executable instructions, and a controller configured to execute the instructions, which cause the controller to operate a fan, perform a deceleration test on the fan to obtain deceleration test data, calculate a variance of the deceleration test data, make a determination that the fan is susceptible to imminent failure based on the variance, and generate a signal for the equipment to enter a low-heat producing mode based on the determination.

Embodiments of the system further may include configuring the controller to generate a notification of susceptibility of the fan to imminent failure. Performing the deceleration test may include capturing a set of deceleration curves. Determining whether the fan is susceptible to imminent failure may include determining whether the variance is greater than a predetermined amount. Performing the deceleration test may be initiated at least one time during a predetermined time period. The controller further may be configured to generate a signal for increasing a speed of a backup fan configured to cool the equipment. The controller further may be configured to lower a first speed of the fan to a second speed in response to the determination. The second speed may be based on at least one of an ambient temperature or equipment temperature. The second speed may be based on equipment load. The controller further may be configured to increase a speed of the fan in response to an event comprising at least one of the equipment being predicted to reach a temperature above a first predetermined threshold, or the equipment reaching a temperature above a second predetermined threshold.

Another aspect of the present disclosure is directed to one or more non-transitory machine-readable media storing instructions that, when executed by one or more processors, cause the one or more processors to operate a fan, perform a deceleration test on the fan to obtain deceleration test data, calculate a variance of the deceleration test data, make a determination that the fan is susceptible to imminent failure based on the variance, and generating a signal for the equipment to enter a low-heat producing mode based on the determination.

Embodiments of the one or more non-transitory machine-readable media storing instructions further may include generating a notification of susceptibility of the fan to imminent failure. Performing the deceleration test may include capturing a set of deceleration curves. Determining whether the fan is susceptible to imminent failure may include determining whether the variance is greater than a predetermined amount. Performing the deceleration test may be initiated at least one time during a predetermined time period. The instructions further may include generating a signal for increasing a speed of a backup fan configured to cool the equipment. The instructions further may include lowering a first speed of the fan to a second speed in response to the determination. The second speed may be based on at least one of an ambient temperature or equipment temperature. The second speed may be based on equipment load. The instructions further may include increasing a speed of the fan in response to an event comprising at least one of the equipment being predicted to reach a temperature above a first predetermined threshold, or the equipment reaching a temperature above a second predetermined threshold.

Another aspect of the present disclosure is directed to a method of assembling a system configured to monitor a fan. In one embodiment, the method comprises providing a controller, and coupling the controller to memory storing controller-executable instructions that, when executed by the controller, cause the controller to operate a fan, perform a deceleration test on the fan to obtain deceleration test data, calculate a variance of the deceleration test data, make a determination that the fan is susceptible to imminent failure based on the variance, and generate a signal for the equipment to enter a low-heat producing mode based on the determination.

Embodiments of the method further may include configuring the controller to generate a notification of susceptibility of the fan to imminent failure. Performing the deceleration test may include capturing a set of deceleration curves. Determining whether the fan is susceptible to imminent failure may include determining whether the variance is greater than a predetermined amount. Performing the deceleration test may be initiated at least one time during a predetermined time period. The controller further may be configured to generate a signal for increasing a speed of a backup fan configured to cool the equipment. The controller further may be configured to lower a first speed of the fan to a second speed in response to the determination. The second speed may be based on at least one of an ambient temperature or equipment temperature. The second speed may be based on equipment load. The controller further may be configured to increase a speed of the fan in response to an event comprising at least one of the equipment being predicted to reach a temperature above a first predetermined threshold, or the equipment reaching a temperature above a second predetermined threshold.

Another aspect of the present disclosure is directed to a system for monitoring a fan used to cool equipment. In one embodiment, the system comprises memory storing controller-executable instructions, and a controller configured to execute the instructions, which cause the controller to operate a fan, perform a deceleration test on the fan to obtain deceleration test data, calculate a variance of the deceleration test data, make a determination that the fan is susceptible to imminent failure based on the variance, and generate a signal for increasing a speed of a backup fan configured to cool the equipment.

Embodiments of the system further may include configuring the controller further to generate a notification of susceptibility of the fan to imminent failure. Performing the deceleration test may include capturing a set of deceleration curves. Determining whether the fan is susceptible to imminent failure may include determining whether the variance is greater than a predetermined amount. Performing the deceleration test may be initiated at least one time during a predetermined time period. The controller further may be configured to generate a signal for the equipment to enter a low-heat producing mode based on the determination. The controller further may be configured to increase a speed of the fan in response to an event comprising at least one of the equipment being predicted to reach a temperature above a first predetermined threshold, or the equipment reaching a temperature above a second predetermined threshold. The controller further may be configured to lower a first speed of the fan to a second speed in response to the determination. The second speed may be based on at least one of an ambient temperature or equipment temperature. The second speed may be based on equipment load.

Another aspect of the present disclosure is directed to one or more non-transitory machine-readable media storing instructions that, when executed by one or more processors, cause operating a fan, perform a deceleration test on the fan to obtain deceleration test data, calculate a variance of the deceleration test data, make a determination that the fan is susceptible to imminent failure based on the variance, and generate a signal for increasing a speed of a backup fan configured to cool the equipment.

Embodiments of the one or more non-transitory machine-readable media storing instructions further may include generating a notification of susceptibility of the fan to imminent failure. Performing the deceleration test may include capturing a set of deceleration curves. Determining whether the fan is susceptible to imminent failure may include determining whether the variance is greater than a predetermined amount. Performing the deceleration test may be initiated at least one time during a predetermined time period. The instructions further may include generating a signal for the equipment to enter a low-heat producing mode based on the determination. The instructions further may include increasing a speed of the fan in response to an event comprising at least one of the equipment being predicted to reach a temperature above a first predetermined threshold, or the equipment reaching a temperature above a second predetermined threshold. The instructions further may include lowering a first speed of the fan to a second speed in response to the determination. The second speed may be based on at least one of an ambient temperature or equipment temperature. The second speed may be based on equipment load.

Another aspect of the present disclosure is directed to a method of assembling a system configured to monitor a fan. In one embodiment, the method comprises providing a controller, and coupling the controller to memory storing controller-executable instructions that, when executed by the controller, cause the controller to operate a fan, perform a deceleration test on the fan to obtain deceleration test data, calculate a variance of the deceleration test data, make a determination that the fan is susceptible to imminent failure based on the variance, and generate a signal for increasing a speed of a backup fan configured to cool the equipment.

Embodiments of the method further may include configuring the controller to generate a notification of susceptibility of the fan to imminent failure. Performing the deceleration test may include capturing a set of deceleration curves. Determining whether the fan is susceptible to imminent failure may include determining whether the variance is greater than a predetermined amount. Performing the deceleration test may be initiated at least one time during a predetermined time period. The controller further may be configured to generate a signal for the equipment to enter a low-heat producing mode based on the determination. The controller further may be configured to increase a speed of the fan in response to an event comprising at least one of the equipment being predicted to reach a temperature above a first predetermined threshold, or the equipment reaching a temperature above a second predetermined threshold. The controller further may be configured to lower a first speed of the fan to a second speed in response to the determination. The second speed may be based on at least one of an ambient temperature or equipment temperature. The second speed may be based on equipment load.

Another aspect of the present disclosure is directed to a system for monitoring a fan used to cool equipment. In one embodiment, the system comprises memory storing controller-executable instructions, and a controller configured to execute the instructions, which cause the controller to operate a fan, perform a deceleration test on the fan to obtain deceleration test data, calculate a variance of the deceleration test data, to make a determination that the fan is susceptible to imminent failure based on the variance, and generate a signal to lower a first speed of the fan to a second speed in response to the determination.

Embodiments of the system further may include configuring the controller to generate a notification of susceptibility of the fan to imminent failure. Performing the deceleration test may include capturing a set of deceleration curves. Determining whether the fan is susceptible to imminent failure may include determining whether the variance is greater than a predetermined amount. Performing the deceleration test may be initiated at least one time during a predetermined time period. The second speed may be based on at least one of an ambient temperature or equipment temperature. The second speed may be based on equipment load. The controller further may be configured to generate a signal for the equipment to enter a low-heat producing mode based on the determination. The controller further may be configured to increase a speed of the fan in response to an event comprising at least one of the equipment being predicted to reach a temperature above a first predetermined threshold, or the equipment reaching a temperature above a second predetermined threshold. The controller further may be configured to generate a signal for increasing a speed of a backup fan configured to cool the equipment.

Another aspect of the present disclosure is directed to one or more non-transitory machine-readable media storing instructions that, when executed by one or more processors, cause operate a fan, perform a deceleration test on the fan to obtain deceleration test data, calculate a variance of the deceleration test data, make a determination that the fan is susceptible to imminent failure based on the variance, and generating a signal to lower a first speed of the fan to a second speed in response to the determination.

Embodiments of the one or more non-transitory machine-readable media storing instructions further may include generating a notification of susceptibility of the fan to imminent failure. Performing the deceleration test may include capturing a set of deceleration curves. Determining whether the fan is susceptible to imminent failure may include determining whether the variance is greater than a predetermined amount. Performing the deceleration test may be initiated at least one time during a predetermined time period. The instructions further may include generating a signal for the equipment to enter a low-heat producing mode based on the determination. The instructions further may include increasing a speed of the fan in response to an event comprising at least one of the equipment being predicted to reach a temperature above a first predetermined threshold, or the equipment reaching a temperature above a second predetermined threshold. The second speed may be based on at least one of an ambient temperature or equipment temperature. The second speed may be based on equipment load. The instructions further may include generating a signal for increasing the speed of a backup fan configured to cool the equipment.

Another aspect of the present disclosure is directed to a method of assembling a system configured to monitor a fan. In one embodiment, the method comprises providing a controller, and coupling the controller to memory storing controller-executable instructions that, when executed by the controller, cause the controller to operate a fan, perform a deceleration test on the fan to obtain deceleration test data, calculate a variance of the deceleration test data, to make a determination that the fan is susceptible to imminent failure based on the variance, and generate a signal to lower a first speed of the fan to a second speed in response to the determination.

Embodiments of the method further may include configuring the controller to generate a notification of susceptibility of the fan to imminent failure. Performing the deceleration test may include capturing a set of deceleration curves. Determining whether the fan is susceptible to imminent failure may include determining whether the variance is greater than a predetermined amount. Performing the deceleration test may be initiated at least one time during a predetermined time period. The second speed may be based on at least one of an ambient temperature or equipment temperature. The second speed may be based on equipment load. The controller further may be configured to generate a signal for the equipment to enter a low-heat producing mode based on the determination. The controller further may be configured to increase a speed of the fan in response to an event comprising at least one of the equipment being predicted to reach a temperature above a first predetermined threshold, or the equipment reaching a temperature above a second predetermined threshold. The controller further may be configured to generate a signal for increasing a speed of a backup fan configured to cool the equipment.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence is intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the disclosure. In the figures:

DETAILED DESCRIPTION

Figure 1:
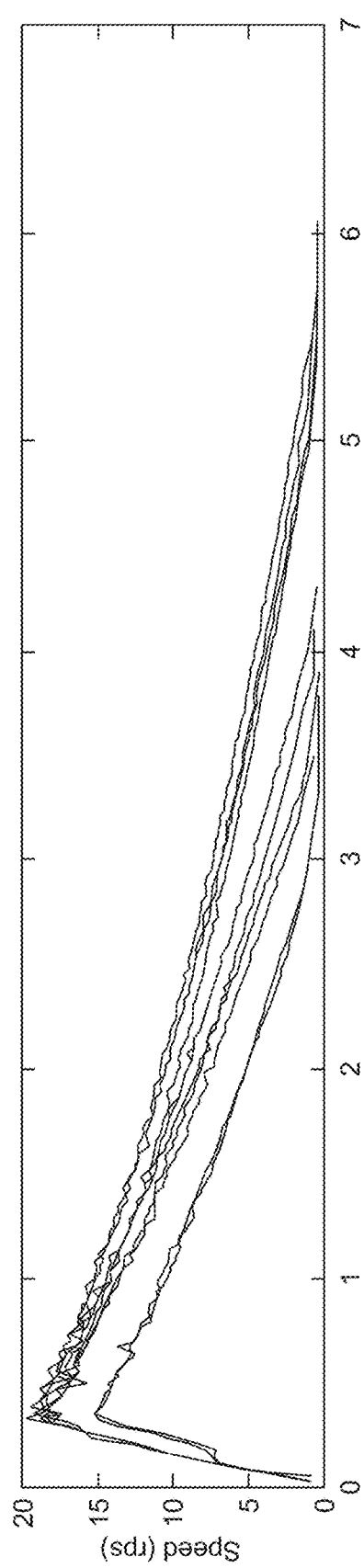
FIG. 1 is a graph showing speed data from a fan responding to pulses over a period of time.

At least one embodiment of the present disclosure includes a fan module that is used, for example, in a power supply, UPS or cooling unit. While existing techniques based on vibrational analysis of motor bearings are effectual they are not necessarily cost effective. Embodiments of the present disclosure propose a solution that requires no additional sensors, using only a tachometer signal available from the motor of the fan. For an exemplary fan unit, a deceleration curve is obtained. Fans with good bearings show consistent deceleration while the fans with contaminated bearing show larger variability in their respective deceleration curves.

Fan bearings can fail because of wear of the bearing caused by particle contamination. This wear may cause the balls and races of the bearing to roughen. A combination of roughness and the particles may cause the bearings to shake at characteristic frequencies. Over time the grinding caused by the contamination can smooth the defects and reduce the vibrations even though the bearing is about to fail. It may be desirable to determine the health of fans to be able to schedule the servicing or replacement of fans that are about to fail. Some methods of estimating the health of a fan use the age of the fan as a proxy for the health of the fan. The assumption is that an older fan is less healthy and therefore all fans past a certain age may be proactively replaced. Health of bearings in high cost rotatory machinery may be monitored using vibrational and temperature sensors. Doing so may be prohibitively expensive. Fan speed and current draw may be indistinguishable between runs with new bearings or aged bearings. A positive acceleration profile is consistent between the two cases. The fans have sufficient power that any variation in the bearing friction can be compensated for by the control circuit or processor.

When the fan is deenergized, the fan may decelerate because of bearing friction and aerodynamic drag. However, fans with aged bearings may show a statistically different characteristic from new fans. A fan with aged bearings may produces inconsistent deceleration curves. The instability of the frictional forces generated by the bearings may be indicative of imminent fan failure. As used herein, imminent fan failure can be a range of times associated with a specific fan. For example, imminent fan failure can be between about one hour and about two hours, about thirty minutes to about one day, about one minute to about one month, about one minute to about one year, or about one minute to about five years.

Embodiments of the systems and methods of the present disclosure enable the condition of the fan to be monitored to enable a scheduled preemptive replacement of the fan before a catastrophic failure. Fan failures may occur because of failure of the fan bearings. Fan bearings may fail because of wear of the bearing caused by particle contamination. These particles cause the bearings to shake at characteristic frequencies. Methods of monitoring fans can increase the cost of the fan assembly, requiring an expensive sensor and a possible upgrade in an embedded processor to perform the needed signal capture and processing.

One embodiment of the present disclosure includes periodically, e.g., once a day, deenergizing the fan and collecting statistics on the deceleration curve to obtain a statistical estimate of the health of the fan. To do this, the fan may be deenergized and a deceleration curve to be captured. Using statistical analysis, the health of the bearings may be obtained from the variance of deceleration between deceleration trials. It should be understood that periodically deenergizing the fan and collecting statistics may be any given range. For example, and not limiting, periodically performing these functions may include every minute, every five minutes, every hour, every twelve hours, every day, every month, or every year.

Fans that have bearings in good health, and have little contamination of lubricant, may decelerate with limited variability in their deceleration curve. After fan bearings degrade, statistically significant variability may exist in the deceleration curves.

Embodiments of the present disclosure may use the variability of a fan deceleration curve to ascertain the health of fan bearings.

Embodiments of the present disclosure can avoid using additional sensors or parts. In some embodiments, minimal parts are required, such as a speed sensor for fans not having a built-in tachometer.

In one embodiment, the health of a fan may be baselined experimentally in a quality assurance lab. While installed in the product, the fan may periodically decelerate to provide the necessary statistics on the variability of the deceleration curve. The collected test deceleration data may be compared to baseline deceleration data to calculate a variance. The baseline deceleration data may be collected for the fan after it is installed to cool equipment or may be loaded into memory of a system for monitoring a fan.

A deceleration curve may be assigned to the assembled fan. This allows a processor or central processing unit (CPU) (e.g., controller) associated with the fan unit to monitor when the fan will fail. In one embodiment, the CPU can be associated with the structure within which the fan is mounted, e.g., the UPS or the cooling unit.

Embodiments of the present disclosure correlate the variability of the shape of the deceleration curve with degraded fan health. Worn bearings may be loser and therefore have lower friction than new bearings. The time to decelerate can change because the product has been moved to a place with different airflow resistance.

Different features of the deceleration curve can show variability (e.g., variance). As an example, statistics from the following features can be obtained:
 the speed after N seconds of deceleration;
 the integral of speed from zero to N seconds after deceleration;
 the time it takes to decelerate to a fixed speed; and
 the time it takes to slow between two rotational speeds.

A consistently small range in any one or combination of these features may indicate better health. Various summary statistics for dispersion may capture the extent of the range.

An exemplary fan may have a 3 mm spindle and have two deep-groove shielded ball bearings with dimension of 3×8×4 mm. The fan bearings can have shields, but can still be contaminated by fine particles.

As used herein variance and variability are used interchangeably and are meant to mean that there is a difference, divergence or inconsistency of deceleration test data.

FIG. 1 shows speed data from the fan responding to 10 pulses of 320 msec over a one-hour period. During acceleration, the fan occasionally shows a step-in acceleration profile as shown. This appears to be a result of a safety feature called locked rotor protection and occurs when there is a high level of friction in the bearings. As shown, ten deceleration curves are obtained over a one-hour period of time.

Figure 2:
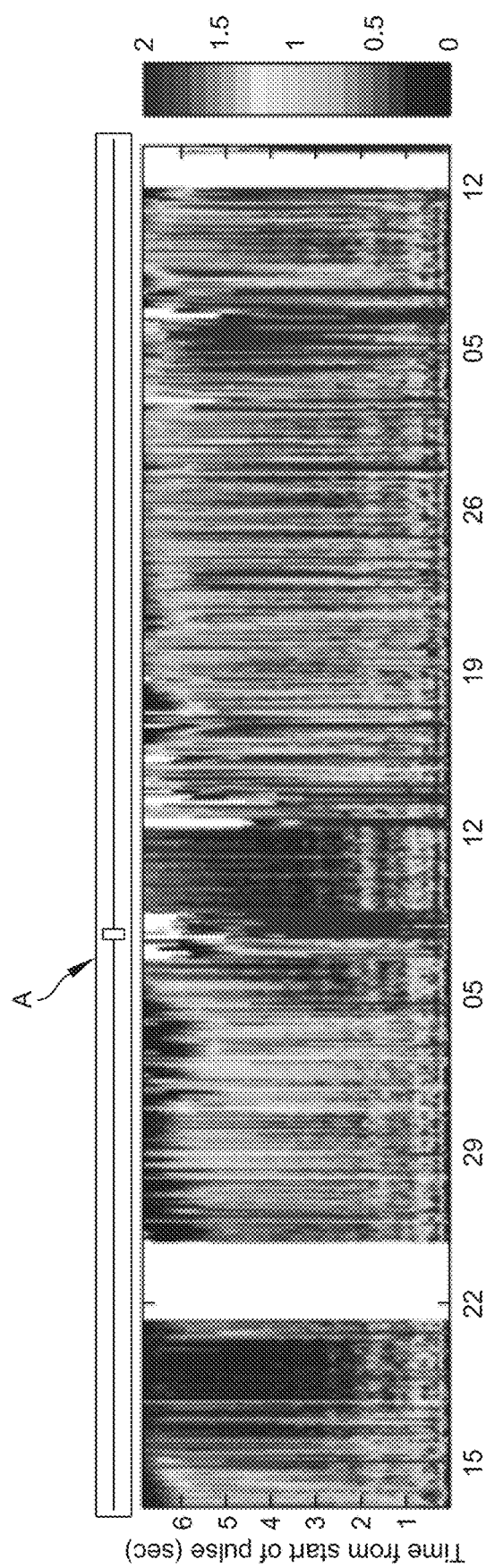
FIG. 2 is a heat map of a range of data for the fan operated in FIG. 1.

FIG. 2 shows a heat map of data collected every hour for a four week period. The range is displayed from the beginning of the trial (the bottom of the heat map) when the fan is accelerated until the fan decelerates and stops. The range is calculated from trials done every five minutes over the hour and is displayed from the beginning of the trial (the bottom of the heat map) when the fan is accelerated until the fan decelerates and stops. Each vertical line therefore shows the range of fan speed for that one-hour period.

Arrow A indicates that the speed has a range greater than 1.5 revolutions per second (RPS). In trials with aged bearings, all fans showed this variation. No data collected with uncontaminated bearings shows a range greater than 0.3 RPS in the deceleration curve.

As shown, a nominal fan with good bearings will come to a complete stop from 20 RPS in about seven seconds with a range of only 0.1 seconds, which is about 1.5% in the deceleration time. As shown in FIG. 2, a fan with bearings that are about to fail can show variations in deceleration time of more than 40%.

In one embodiment, a method of monitoring a fan unit includes (a) periodically performing a deceleration test on the fan, (b) tracking the range in deceleration over week and months, and (c) then determining if the range has grown sufficiently to indicate that the fan is susceptible to imminent failure. As shown above with reference to FIG. 1, obtaining deceleration speed data includes comparing one or more deceleration curves taken over a period of time for a fan. This information is used to identify a normal operation of the fan. Periodic deceleration tests are compared to the deceleration curves obtained for the fan. Comparing results from the deceleration test to the deceleration speed data includes comparing the deceleration curves to the test deceleration curve. When determining whether the fan is susceptible to imminent failure, the test deceleration curve is found to show statistically significant variability from the deceleration curves by a predetermined amount.

Example

In one approach to accelerating the aging of a bearing, diamond particles are used as a contaminant, while in another approach, quartz powder is used. Hard particles can be used as a surrogate for the brittle debris created when a bearing runs "dry" from lubrication failure.

Figure 5:
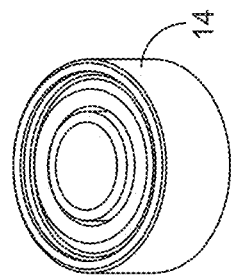
FIGS. 4 and 5 are exemplary bearings used in a fan.
Figure 4:
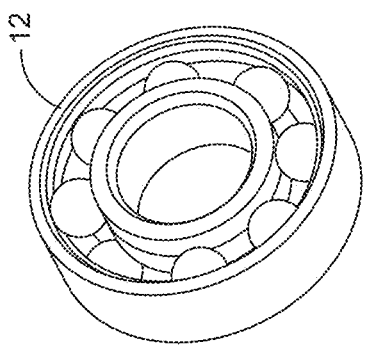
Figure 3:
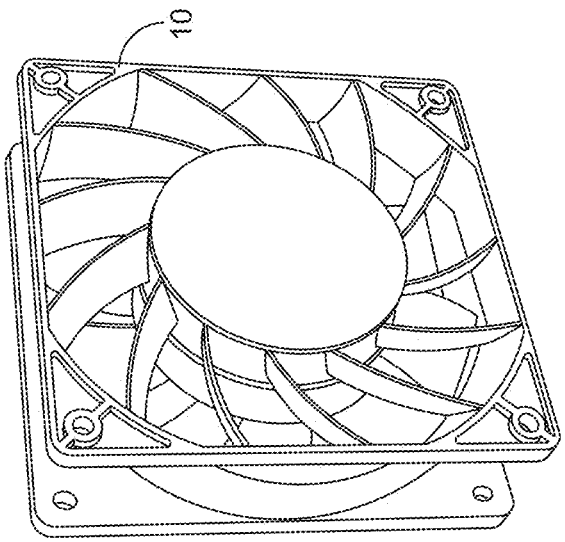
FIG. 3 is an exemplary fan used to conduct methods of the present disclosure.

In one example, several fans, such as the fan 10 illustrated in FIG. 3, are used to test for bearing failure. Each fan incorporates a bearing, such as the bearing 12 shown in FIG. 4 or the bearing 14 shown in FIG. 5, and is subjected to bearing acceleration wear by employing 1200 grit (4-micron diameter) Aluminum Oxide abrasive powder. The bearings are contaminated by placing them in a tumbler along with one tablespoon (14.8 ml) of grit for 20 minutes. In one embodiment, a single barrel rock tumbler provided by Lortone is used with a 4¾-inch-high by 4½-inch diameter barrel. After tumbling, some of the bearings seized with contamination while the remaining bearings are used for the experiment.

Each fan is disassembled, and the two bearings are replaced with the contaminated bearings. Disassembly requires the removal of the product label and a retaining ring washer from the end of the 3 mm fan shaft. Each fan is reassembled with the contaminated bearings and a new washer.

Rotational speed data is collected using an IR beak sensor. Using a spring clamp, the sensor is mounted to the fan so that the moving fan blades breaks the IR beam. Using a GPIO pin of the microcontroller, the sensor generated hardware interrupts whenever a fan blade interrupts the IR beam.

In one embodiment, experiments are performed on a fan which is a 24 Volt DC fan drawing 0.36 Ampere. The dimensions of the fan are 120 mm length by 120 mm height by 38 mm width, with the fan running at 2600 RPM. The fan has an L10 life at 40° C. of 65,000 hours (7.5 years). The fans are setup on a lab bench to run with a 24 Volt DC power supply in free airflow conditions. The setup is isolated from the general lab environment by using a large plastic box as a cover. Fans run continuously.

The experiment is controlled using a Python script. Every six minutes, for example, the script turns off the fan for 10 seconds, and then pulses the fan for 320 msec, and then waits 10 seconds before turning the fan on again. However, the fan may be shut off for any period of time, e.g., about four minutes to about ten minutes, and the pulsing of the fan can take place until the fan completely stops.

Using a pulse of 320 msec, the fans only have time to accelerate to between about 20 RPS and about 25 RPS, slow enough to measure speed reliably. Any bearing abnormality is hypothesized to be more noticeable at lower speeds. The Example of embodiments of the present disclosure consist of ten trials, with two trials using uncontaminated bearings to set a baseline. Trial #1 ran for 90 days with bearings baked at 135° C. for 17 days. These aged bearings showed no sign of failing and had consistent deceleration for the entire trial. Trial #2 used a set of new bearings and ran for 52 days. This fan also showed consistent deceleration for the entire trial and no sign of failing.

Eight trials were done with contaminated bearings and all resulted in fan failure. Trial #5 lasted only 2.5 days after which the bearings had seized. In Trial #10, the bearings seized after 12 days. In both cases, it appears that the bearings seized because the combination of abrasive, lubricant and metal debris jammed the bearing. The debris was not able to leave the bearing because of the bearing shields.

Figure 6:
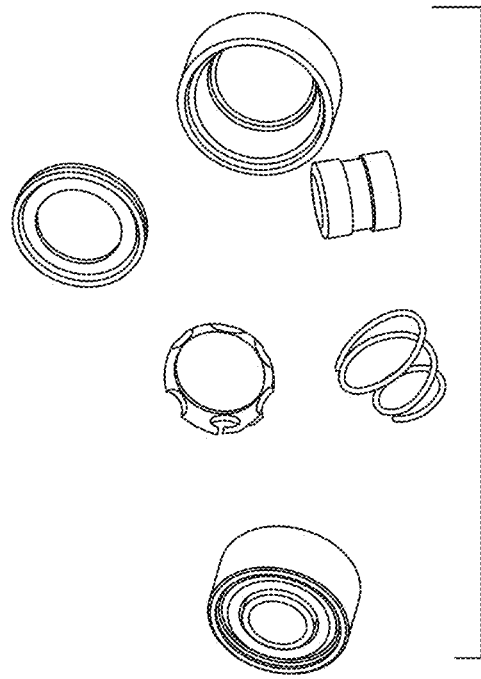
FIG. 6 illustrates a destroyed bearing.

The remaining six trials lasted between about 17 days and about 50 days. These trials resulted in one of the bearings disintegrating. FIG. 6 shows the representative condition of the single row, deep groove bearing at the end of the trials. In the factory, the ball bearings and the two grooved races are pressed together. When the balls erode too much there is no longer anything holding the bearing together, and the bearing breaks apart.

In several trials, before the fan stopped, balls from the bearing escaped on to the test bench, and the fan was continued running on the one remaining bearing. In only one trial, Trial #3, did the fan result in catastrophic failure, with fan blades hitting the housing, cracking and flying off the fan.

Figure 7A:
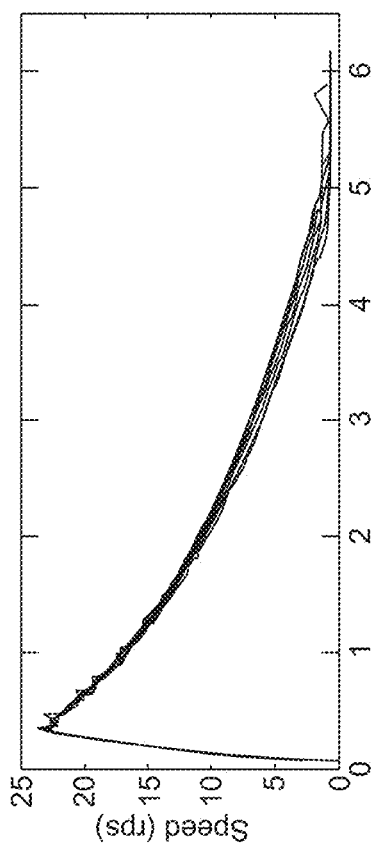
FIGS. 7A-7D are graphs illustrating deceleration data from a fan over predetermined periods of time.
Figure 7B:
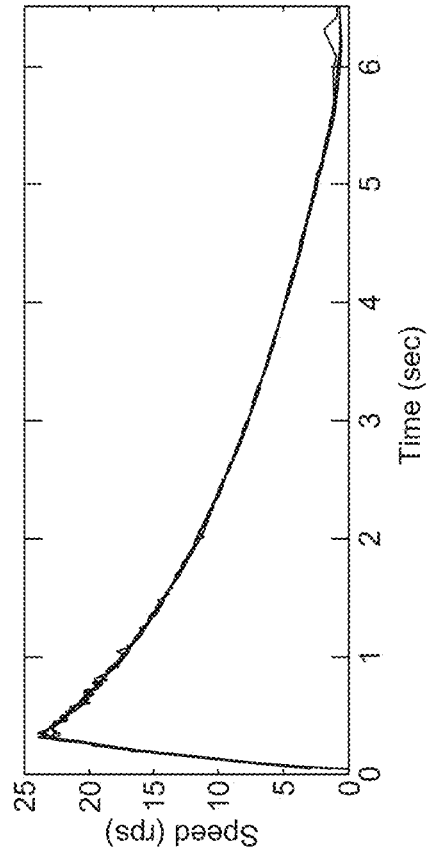
Figure 7C:
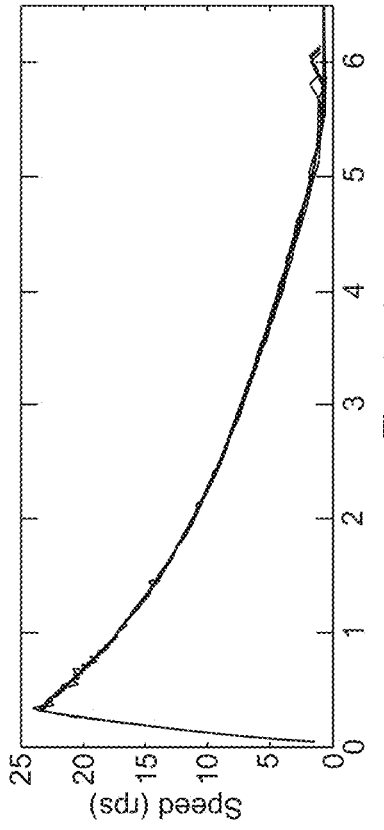
Figure 7D:
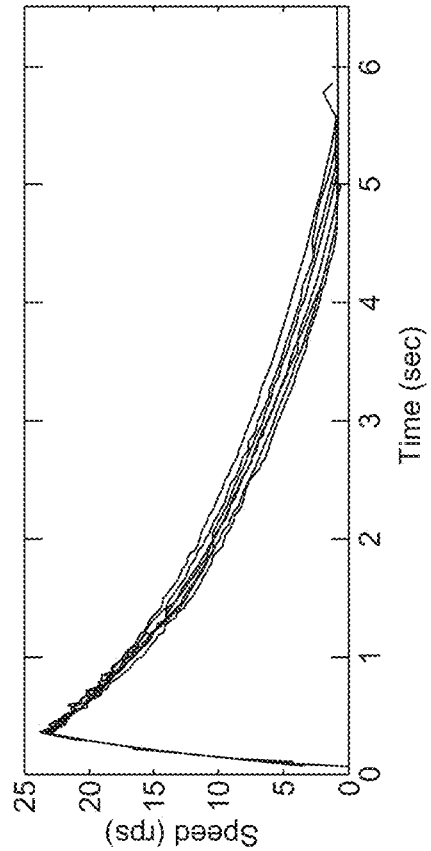

FIGS. 7A-7D show representative impulse responses of the fan from Trial #8, where the fan has grit-contaminated bearings. As shown, each graph represents an impulse response of the fan for 12 trials over one hour. Day 1, shown in FIG. 7A, shows consistent deceleration before any significant damage has done to the bearings. Day 10, shown in FIG. 7B, shows the first inconsistent deceleration. Day 17, shown in FIG. 7C, shows a predetermined time period (e.g., a 24-hour period) where the fan behavior is very inconsistent. Day 19, shown in FIG. 7D, corresponds to the period at the end of the trial when the bearings have loosened, and showing less friction. Because they are now loose, the debris in the bearing produces less variability in deceleration. The fan finally failed after 26 days.

The four graphs in FIGS. 7A-7D show bumps in the speed data as the fan speed approaches zero. Fan indexing produces these artifacts. The magnetic of brushless DC fans indexed their position, resulting in only several stable stationary orientations of the fan blade. The indexing can cause the fan to oscillate around the index positions for several seconds. Therefore, when measuring fan deceleration, an accurate measure of deceleration to a zero velocity cannot be measured.

Figure 8A:
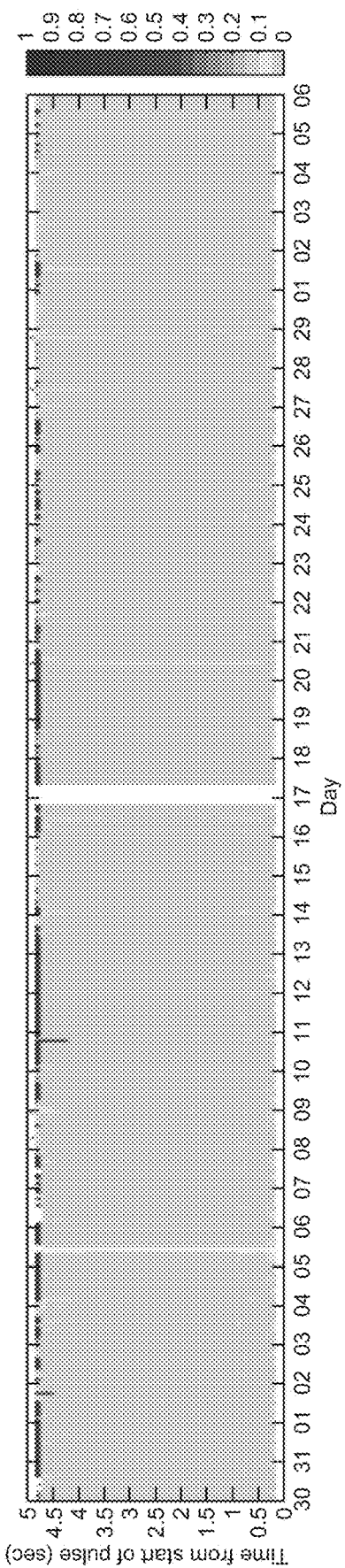
FIGS. 8A and 8B are heat maps illustrating deceleration data of fans for a fan using new bearings (FIG. 8A) and for a fan using contaminated bearings (FIG. 8B)
Figure 8B:
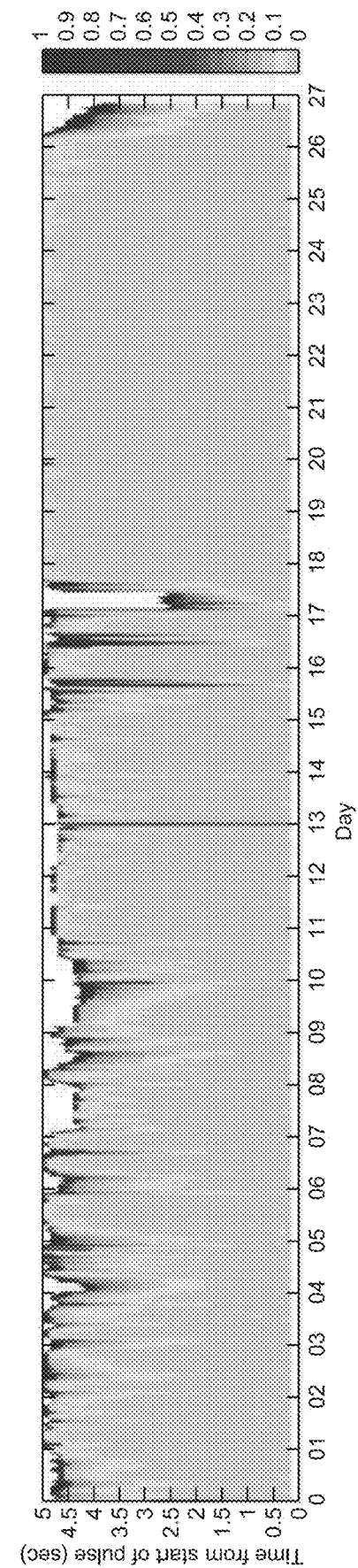

Referring to FIGS. 8A and 8B, a heat map graphically shows the variability of the impulse response for every hour over the entire length of the trail. FIG. 8A shows one-month of data from Trial #2 using new bearings. FIG. 8B shows one-month of data from Trial #8 using contaminated bearings. The horizontal axis shows the elapse time of the trial, with the trial starting on the left. As in FIGS. 7A-7D, the two heat maps show the variability in the response to the 320 msec impulse for twelve trials conducted every five minutes over one hour of run time. The heat map color shows the ratio of range of speed to the maximum rotational speed. (As an example, a range of 1.5 RPS when the maximum speed is 15 RPS gives a ratio of 0.1.) Dark (or red colors) show a ratio of greater than 0.3.

The heat map for Trial #2 (FIG. 8A) shows a 37-day snapshot of data from a three-month trial. This is one of the two trials that were used to ascertain the baseline behavior for good bearings. The displayed data is after a three-week break-in period when the fan decelerated slightly faster and had slowly varying deceleration time.

The heat map for Trial #8 (FIG. 8B) includes the four hours of data shown in FIGS. 7A-7D. This heat map shows almost no variability in the acceleration response to the impulse but a significant variability to the deceleration after the impulse.

The heat map shows a one-week window before the end of the experiment where the fan decelerates consistently with minimal friction. This appears to correspond to the behavior of worn bearings noted by others.

During the last day of the trial, before the fan fails, the fan decelerates inconsistently and gradually takes less time to decelerate. At the end of this trial, the outside bearing came apart, and fan ran on just the inside bearing until that bearing jammed. When restarted by hand the fan continued to run on the one bearing.

Consistent with Trial #2 and #8 more than half the fans showed a run-in period where the fan initially had more friction than later in the experiment.

FIGS. 9A-9J show data from all ten trials. Instead of one heat map per trial, each trial represents as a single line graph. The arithmetic mean of the range data from the time interval of 2-5 seconds from the start of the trial is calculated and then normalized by dividing it by the maximum speed at each sample interval. This statistic compared for every hour for the duration of the trial.

Figure 9A:
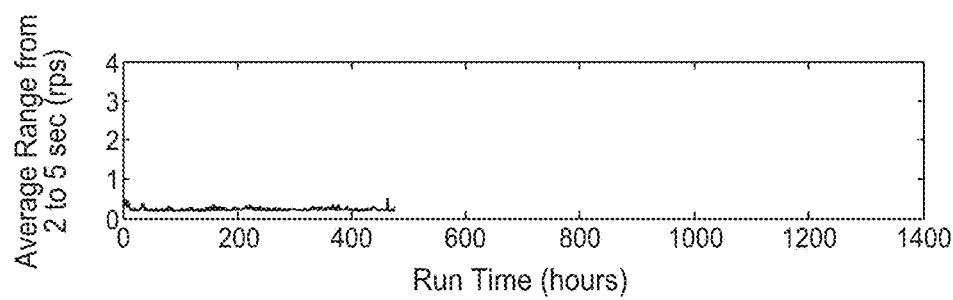
FIGS. 9A-9J are graphs illustrating deceleration data obtained for ten fan trials.
Figure 9B:
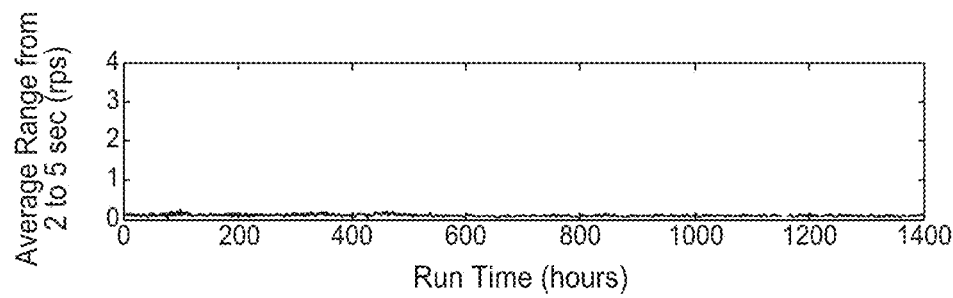
Figure 9C:
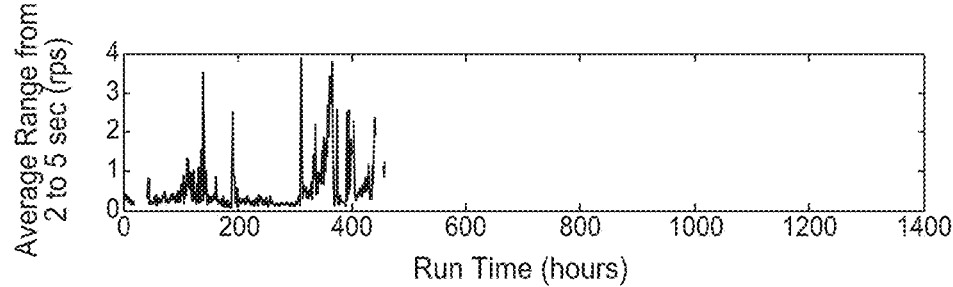
Figure 9D:
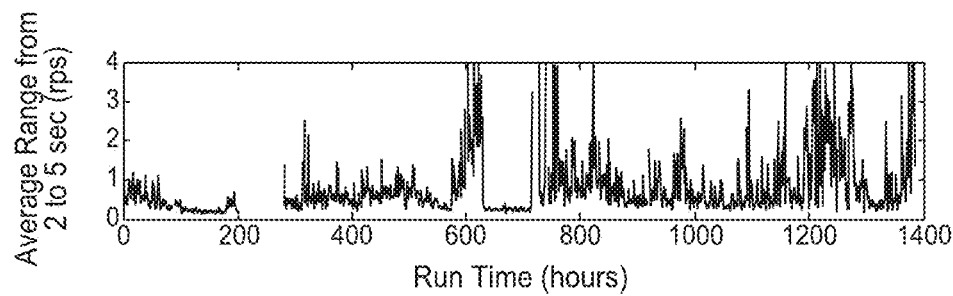
Figure 9E:
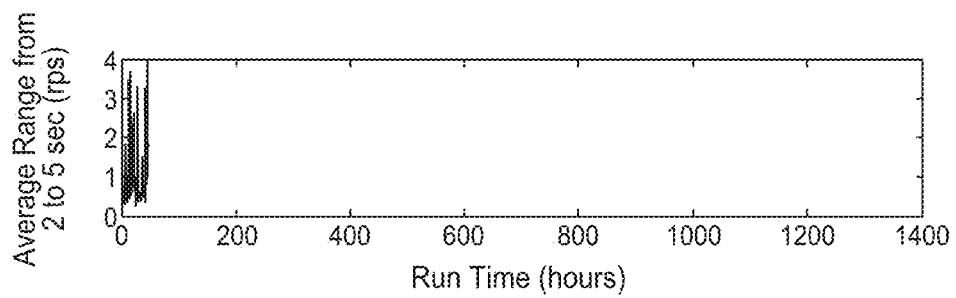
Figure 9F:
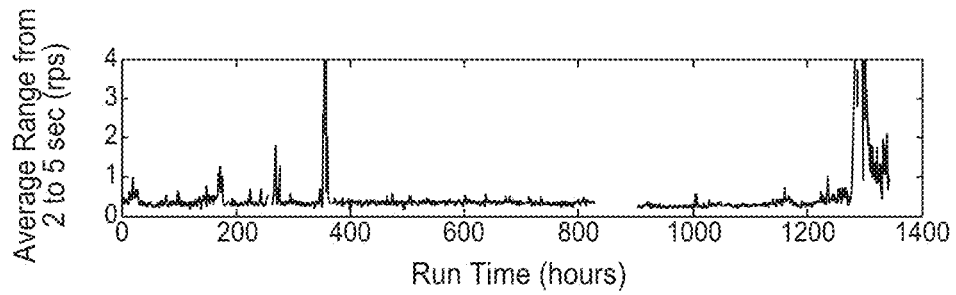
Figure 9G:
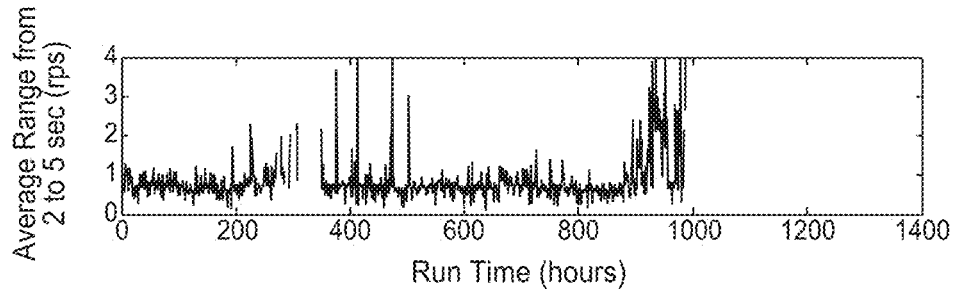
Figure 9H:
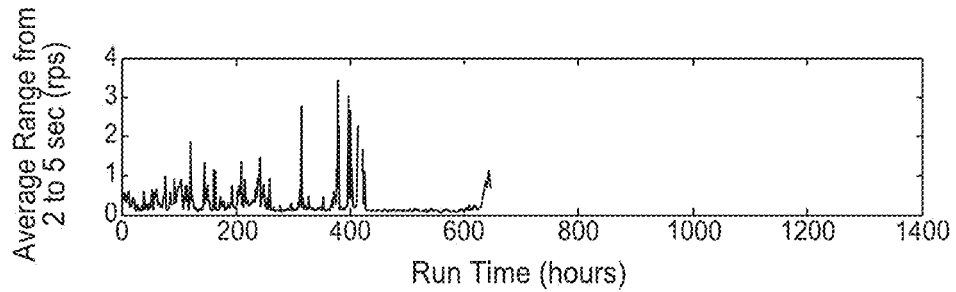
Figure 9I:
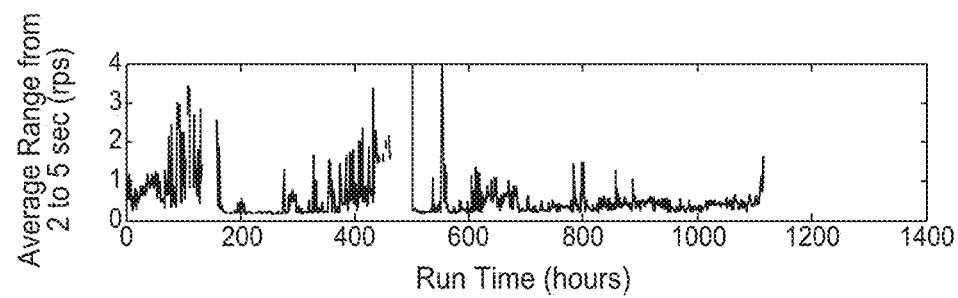
Figure 9J:
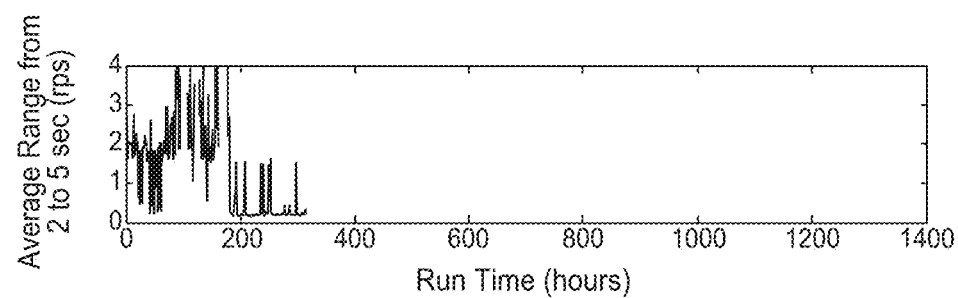

FIGS. 9A and 9B show the statistics from Trial #1 and #2 with uncontaminated bearings. These graphs show low variability in the deceleration profile for the entire trial. FIGS. 9C-9J show the results from the contaminated bearings.

Figure 10:
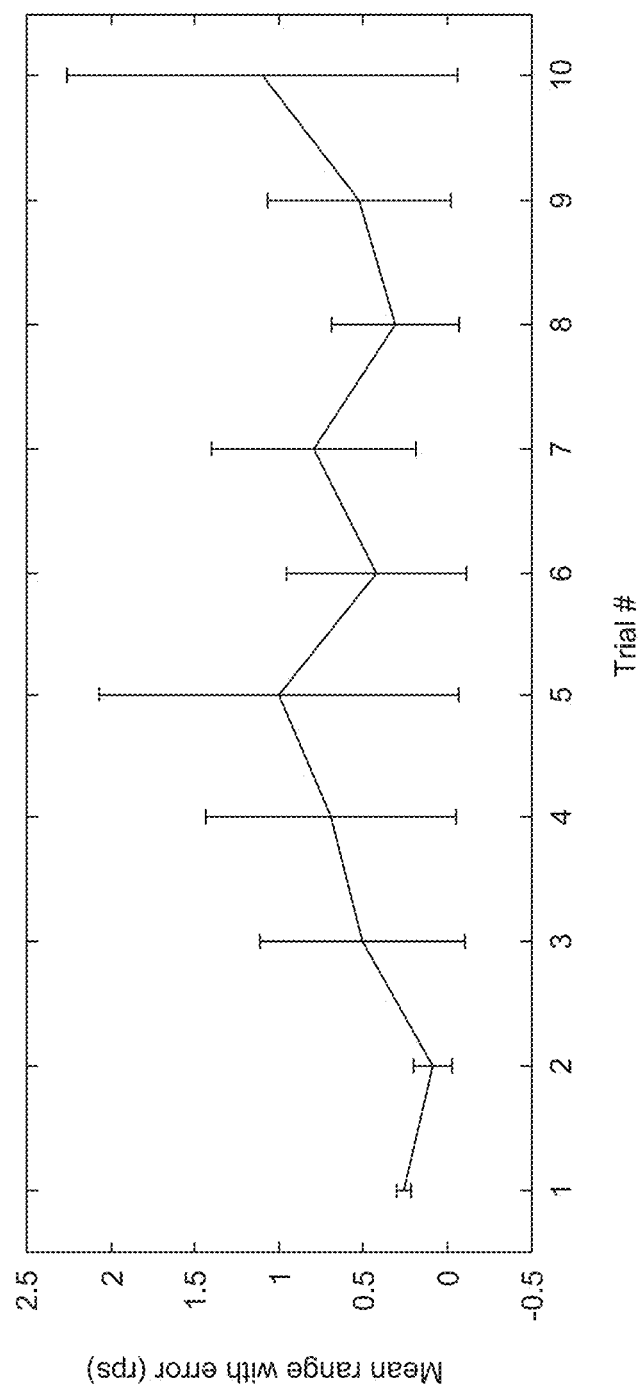
FIG. 10 is a graph compressing the data obtained from FIGS. 9A-9J to achieve mean and standard deviation data for each trial.

FIG. 10 further compresses the trial data to the mean and standard deviation of the range for each trial shown in FIGS. 9A-9J. This graph shows Trial #1 and Trial #2 have significantly less variability in the deceleration curves than the trials with contaminated bearings.

Figure 11:
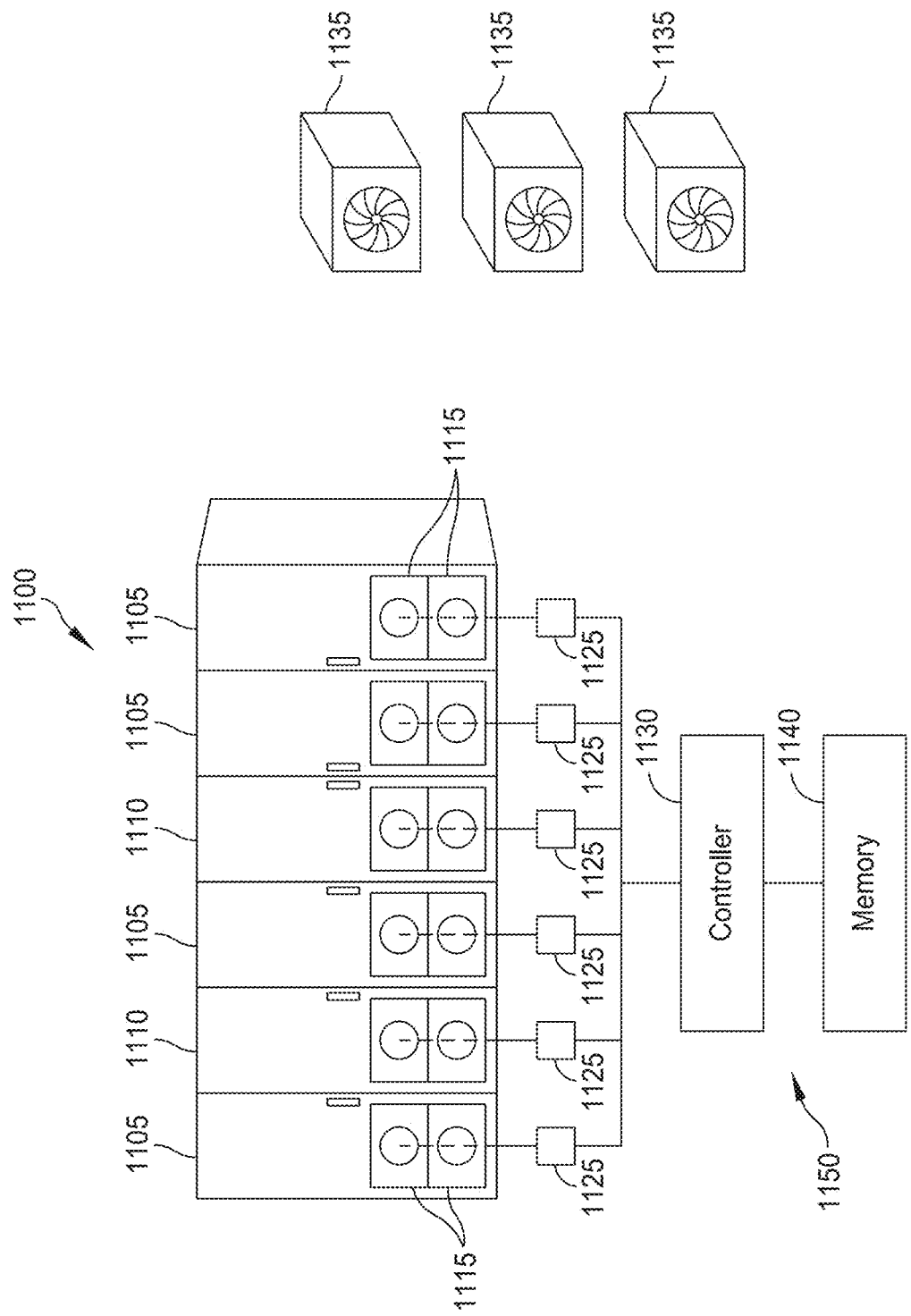
FIG. 11 is a schematic view of a portion of a data center having equipment racks and cooling racks with fan units being configured to cool equipment in the equipment racks and the cooling racks.

Referring to FIG. 11, a portion of a data center is generally indicated at 1100. As shown, the data center 1100 includes several uninterruptible power supplies (UPSs), each indicated at 1105, and several cooling units, each indicated at 1110. Each UPS includes one or more fan units, each indicated at 1115, to move air within the UPS. Similarly, each cooling unit includes one or more fan units, also indicated at 1115, to move air within the cooling unit. Each fan unit 1115 includes one or more rotary fan. Some methods described herein are directed to monitoring fans of the fan units 1115 provided within the UPSs 1105 and the cooling units 1110, respectively, and to performing one or more functions in the event a particular fan unit is susceptible to imminent failure.

As shown, each fan unit 1115 is coupled to a sensor 1125 provided to monitor a parameter of the fan unit. Specifically, for example, the sensor 1125 is configured to collect rotational speed data using an IR beak sensor. In one embodiment, the sensor 1125 is mounted to the fan unit 1115 by a spring clamp so that the moving fan blades breaks the IR beam. Other configurations for mounting the sensor 1125 on the fan unit 1115 may be provided. The sensors 1125 are coupled to a controller 1130, which as mentioned above, is configured to control the operation of the fan unit 1115. The controller 1130 may be embedded in the UPS 1105 and/or the cooling unit 1110 to control the operation of the UPS or the cooling unit, respectively, or may be a separate controller dedicated to control the operations of the fan units 1115.

In one embodiment, the controller 1130 is configured to perform a deceleration test on the fans of the fan units 1115 to obtain deceleration test data. Based on the deceleration test data, the controller 1130 is configured to calculate a variance of the deceleration test data, and make a determination of whether the fan unit 1115 is susceptible to imminent failure. The controller 1130, when performing the deceleration test, further is configured to capture a set of deceleration curves. The controller 1130, when determining whether the fan unit 1115 is susceptible to imminent failure, further is configured to determine whether the variance is greater than a predetermined amount. The predetermined amount may be stored in memory 1140 during assembly or determined during the operation of the fan. The controller 1130, when performing a deceleration test on the fan unit 1115, further is configured to include conducting a deceleration test at least one time during a predetermined time period.

In some embodiments, the deceleration tests can be performed on a predetermined schedule, e.g., periodically. In other embodiments, the deceleration tests can be performed randomly or when it is determined that a fan unit 1115 or the equipment being cooled by the fan is not properly functioning.

As described herein, a system configured to monitor a fan, such as fan units 1115 used to cool equipment, such as UPSs 1105 and cooling units 1110, is generally indicated at 1150. As shown, the system 1150 includes the memory 1140 to store controller-executable instructions and the controller 1130 to execute the instructions. In one embodiment, the controller 1130 to operate the fan unit 1115, to perform a deceleration test on the fan unit 1115, to obtain deceleration test data, to calculate a variance of the deceleration test data, to make a determination that the fan unit is susceptible to imminent failure based on the variance, and to perform a function based on the determination of imminent failure.

In some embodiments, if the fan unit 1115 is determined to be susceptible to imminent failure as indicated by the controller 1130, the controller further is configured to perform one or more functions described herein. In one embodiment, the controller 1130 is configured to generate a signal for the equipment, e.g., UPS 1105, to enter a low-heat producing mode.

In another embodiment, the controller 1130 is configured to generate a signal for increasing a speed of a backup fan, e.g., fan unit 1135, that is configured to cool the equipment, e.g., UPS 1105. The controller 1130 can be configured to increase a speed of the backup fan unit 1135 from a first speed, e.g., zero RPM, to a second speed up to and including maximum rated speed of the backup fan unit, or anywhere in between.

In another embodiment, the controller 1130 is configured to generate a signal to lower a first speed of the fan unit 1115 to a second, lower speed. The controller 1130 can be configured to decrease or lower the first speed of the fan unit 1115, which may be a maximum rated speed of the fan unit, to the second speed of the fan unit, which may be zero RPM, or anywhere in between. In one embodiment, the second speed is based on at least one of a present or predicted ambient temperature or a present or predicted the equipment temperature. For example, the second speed of the fan unit 1115 may be a first temperature when the ambient or equipment temperature is low or the second speed of the fan unit 1115 may be a second temperature that is higher than the first temperature when the ambient or equipment temperature is high. In another embodiment, the second speed is based on present or predicted equipment load, which may be based on current provided to the equipment or drawn by the equipment, e.g., UPS 1105. The equipment load may be a present or predicted measure of heat dissipated by the equipment. The equipment load may be a present or predicted measure of computational resources used by the equipment. One example of a measure of computational resources is CPU frequency.

In some embodiments, the controller 1130 is configured to generate a signal for the equipment, e.g., UPS 1105, to increase a speed of the fan in response to an event in which the equipment is predicted to reach a temperature above a first predetermined threshold, or the equipment reaches a temperature above a second predetermined threshold. In one embodiment, the first predetermined threshold and the second predetermined threshold may be the same temperature or different temperatures. The first and/or second predetermined temperatures may be temperatures at which the equipment may be damaged, operate improperly, or operate inefficiently.

In some embodiments, the controller 1130 is configured to generate a signal to initiate a replacement of the fan with a new fan unit 1135. The signal may be a notification to a user or device that the fan will fail imminently or within or at a day and/or time (e.g., within one week or in one week). As shown in FIG. 11, several new fan units 1135 are available to be used as replacement fan or backup fan units.

In some embodiments, the controller 1130 is configured to generate a signal to initiate an alarm (visual or audible) or some other type of notification.

In some embodiments, the memory 1140 includes memory storing controller-executable instructions that can be embedded within the controller 1130, can be external to the controller, or can include a combination thereof. In some embodiments, a system for monitoring a fan can have a controller 1130 and a memory 1140.

The Example provided herein shows that fans with new and clean bearings and fans with contaminated bearings that eventually fail may be distinguished. Using one or more statistics that quantifies the variability of the deceleration curves may be used.

Embodiments of the methods disclosed herein may be employed in differing use scenarios, including but not limited to "typical" use, "mission critical" use, and/or difficult accessibility. These use cases may be combined.

Typical Use

In a "typical" use scenario, a user desires to receive a notification of when a fan fails or when a fan is about to fail. The user is interested in being notified when the fan is susceptible to imminent failure so that the user has an opportunity to replace the fan with a new fan, for example. Determining whether the fan is susceptible to imminent failure includes determining whether the test deceleration curves show statistically significant variability from each other by at least predetermined amount. The user can select a predetermined time period in which to conduct the deceleration test.

Mission Critical Use

Another scenario is a "mission critical" use case in which it is desired to prevent equipment cooled by the fan to overheat under any circumstances. The fan is part of an automated system in which the equipment serviced (i.e., cooled) by the fan in a low-heat producing mode. This is mode where the equipment produces less heat than under standard operation. In one embodiment, the low-heat producing mode can include a safe-shutdown process in which the equipment is shut down. The low-heat producing mode may be a mode where fewer computational resources are used (e.g., economy mode). In another embodiment, the failing fan can be deactivated. Instead or in addition to deactivating a failing fan, a backup fan may be activated to cool the equipment. For example, a speed of the failing fan can be lowered from a first speed (e.g., operating speed) to a second speed (e.g., zero RPM). A speed of the backup fan can be increased from a first speed, e.g., zero RPM, to a second speed of the fan. The first speed may be a minimum speed and the second speed may be a maximum speed.

As with the "typical" scenario, the "mission critical" use relies on determining whether the fan is susceptible to imminent failure, which may include determining whether the variance of the deceleration test data is greater than a predetermined amount. In one embodiment, the user can select a predetermined time period in which to conduct the deceleration test.

Difficult Accessibility

Another scenario is a "difficult accessibility" scenario in which a user cannot reach the failing fan quickly to replace the failing fan and desires to extend the life of the failing fan, if possible. When the fan is difficult to access, one option is to put the equipment in a low-heat-producing mode (e.g., an economy mode), if possible. Another option is to lower a speed of the failing fan. Lowering the fan speed may include reducing a speed of the fan from the present operating fan speed to a lower fan speed, e.g., zero RPM. Lowering fan speed can be done based on ambient temperature of the data center or on equipment temperature of select equipment, e.g., a UPS. For example, in a cool climate, the fan speed can be more than in a hot climate. In addition, lowering fan speed can be done based on the equipment load. Equipment load can be based on current measured to select equipment, e.g., a UPS. For example, when equipment is not expected to produce a lot of heat, the fan speed can be safely decreased.

Alternatively, the fan speed can be lowered based on detection of imminent failure as described above. Based on the conditions, e.g., ambient temperature or load, the speed of the failing fan can be decreased or increased as necessary. Another option is to lower the speed of the failing fan, such as deactivating the failing fan, while speeding up another one or more fan in system (e.g., backup fans or other fans). The speed of a backup fan can be increased from a minimum speed, e.g., zero RPM, to a maximum rated speed for the backup fan.

As with the "typical" and "mission critical" scenarios, the "difficult accessibility" scenario relies on determining whether the fan is susceptible to imminent failure, which may include determining whether the deceleration test data show variability above a predetermined amount. The user can select a predetermined time period in which to conduct the deceleration test.

It is to be appreciated that embodiments of the devices and methods discussed herein are not limited in application to the details of construction and the arrangement of components set forth in the following description or illustrated in the accompanying drawings. For example, the methods described herein can be applied to other drive mechanisms, such as variable speed drive systems.

The devices and methods are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. A system for monitoring a fan used to cool equipment, the system comprising:
   memory storing controller-executable instructions; and
   a controller configured to execute the instructions, which cause the controller to operate a fan,
      perform a deceleration test on the fan to obtain deceleration test data,
      calculate a variance of the deceleration test data,
      make a determination that the fan is susceptible to imminent failure based on the variance, and
      generate a signal for the equipment to enter a low-heat producing mode based on the determination,
      wherein the controller further is configured to lower a first speed of the fan to a second speed in response to the determination, and
      wherein the second speed is based on at least one of an ambient temperature or equipment temperature.

2. The system of claim 1, wherein the controller further is configured to generate a notification of susceptibility of the fan to imminent failure.

3. The system of claim 1, wherein performing the deceleration test includes capturing a set of deceleration curves.

4. The system of claim 1, wherein determining whether the fan is susceptible to imminent failure includes determining whether the variance is greater than a predetermined amount.

5. The system of claim 1, wherein performing the deceleration test is initiated at least one time during a predetermined time period.

6. The system of claim 1, wherein the controller further is configured to generate a signal for increasing a speed of a backup fan configured to cool the equipment.

7. The system of claim 1, wherein the second speed is based on equipment load.

8. The system of claim 1, wherein the controller further is configured to increase a speed of the fan in response to an event comprising at least one of the equipment being predicted to reach a temperature above a first predetermined threshold, or the equipment reaching a temperature above a second predetermined threshold.

9. One or more non-transitory machine-readable media storing instructions that, when executed by one or more processors, cause the one or more processors to:
   operate a fan;
   perform a deceleration test on the fan to obtain deceleration test data;
   calculate a variance of the deceleration test data;
   make a determination that the fan is susceptible to imminent failure based on the variance;
   generating a signal for equipment to enter a low-heat producing mode based on the determination; and
   lower a first speed of the fan to a second speed in response to the determination,
   wherein the second speed is based on at least one of an ambient temperature or equipment temperature.

10. The one or more non-transitory machine-readable media of claim 9, further storing instructions that, when executed by one or more processors, cause:
    generating a notification of susceptibility of the fan to imminent failure.

11. The one or more non-transitory machine-readable media of claim 9, wherein performing the deceleration test includes capturing a set of deceleration curves.

12. The one or more non-transitory machine-readable media of claim 9, wherein determining whether the fan is susceptible to imminent failure includes determining whether the variance is greater than a predetermined amount.

13. The one or more non-transitory machine-readable media of claim 9, wherein performing the deceleration test is initiated at least one time during a predetermined time period.

14. The one or more non-transitory machine-readable media of claim 9, further storing instructions that, when executed by one or more processors, cause:
   generating a signal for increasing a speed of a backup fan configured to cool the equipment.

15. The one or more non-transitory machine-readable media of claim 9, wherein the second speed is based on equipment load.

16. The one or more non-transitory machine-readable media of claim 9, further storing instructions that, when executed by one or more processors, cause:
   increasing a speed of the fan in response to an event comprising at least one of the equipment being predicted to reach a temperature above a first predetermined threshold, or the equipment reaching a temperature above a second predetermined threshold.

* * * * *